(12) United States Patent
Chen et al.

(10) Patent No.: US 11,128,842 B2
(45) Date of Patent: Sep. 21, 2021

(54) IMAGE PROCESSING METHOD AND ASSOCIATED IMAGE PROCESSING CIRCUIT

(71) Applicant: Realtek Semiconductor Corp., HsinChu (TW)

(72) Inventors: Yan-Fong Chen, HsinChu (TW); Wen-Tsung Huang, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/894,871

(22) Filed: Jun. 7, 2020

(65) Prior Publication Data

US 2021/0127095 A1  Apr. 29, 2021

(30) Foreign Application Priority Data

Oct. 28, 2019  (TW) .................................. 108138807

(51) Int. Cl.
*H04N 9/04* (2006.01)
(52) U.S. Cl.
CPC ....... *H04N 9/0451* (2018.08); *H04N 9/04515* (2018.08)

(58) Field of Classification Search
CPC .......................... H04N 9/0451; H04N 9/04515
See application file for complete search history.

(56) References Cited

U.S. PATENT DOCUMENTS

2007/0285526 A1   12/2007  Mann
2015/0163465 A1*   6/2015  Li ...................... H04N 9/04515
                                                348/308
2018/0357750 A1*  12/2018  Chen .................... G06T 3/4038

* cited by examiner

*Primary Examiner* — Ahmed A Berhan
(74) *Attorney, Agent, or Firm* — Winston Hsu (57) ABSTRACT

An image processing method is provided, wherein the image processing method includes the steps of: receiving raw image data from an image sensor, wherein the image sensor is a four-cell Bayer sensor, the raw image data includes color information of each pixel, and the color information of each pixel only corresponds to a single color; for a specific pixel to be processed, selecting a region including the specific pixel; referring to a position of the specific pixel to determine whether to flip color information within the region to generate a flipped region; and using color information of at least one portion of pixels within the region or the flipped region to perform an interpolation operation, to generate color information that the specific pixel lacks.

18 Claims, 11 Drawing Sheets

| P00 (R00) | P01 (R01) | P02 (G02) | P03 (G03) | P04 (R04) | P05 (R05) | P06 (G06) | P07 (G07) | P08 (R08) | P09 (R09) |
|---|---|---|---|---|---|---|---|---|---|
| P10 (R10) | P11 (R11) | P12 (G12) | P13 (G13) | P14 (R14) | P15 (R15) | P16 (G16) | P17 (G17) | P18 (R18) | P19 (R19) |
| P20 (G20) | P21 (G21) | P22 (B22) | P23 (B23) | P24 (G24) | P25 (G25) | P26 (B26) | P27 (B27) | P28 (G28) | P29 (G29) |
| P30 (G30) | P31 (G31) | P32 (B32) | P33 (B33) | P34 (G34) | P35 (G35) | P36 (B36) | P37 (B37) | P38 (G38) | P39 (G39) |
| P40 (R40) | P41 (R41) | P42 (G42) | P43 (G43) | P44 (R44) | P45 (R45) | P46 (G46) | P47 (G47) | P48 (R48) | P49 (R49) |
| P50 (R50) | P51 (R51) | P52 (G52) | P53 (G53) | P54 (R54) | P55 (R55) | P56 (G56) | P57 (G57) | P58 (R58) | P59 (R59) |
| P60 (G60) | P61 (G61) | P62 (B62) | P63 (B63) | P64 (G64) | P65 (G65) | P66 (B66) | P67 (B67) | P68 (G68) | P69 (G69) |
| P70 (G70) | P71 (G71) | P72 (B72) | P73 (B73) | P74 (G74) | P75 (G75) | P76 (B76) | P77 (B77) | P78 (G78) | P79 (G79) |
| P80 (R80) | P81 (R81) | P82 (G82) | P83 (G83) | P84 (R84) | P85 (R85) | P86 (G86) | P87 (G87) | P88 (R88) | P89 (R89) |
| P90 (R90) | P91 (R91) | P92 (G92) | P93 (G93) | P94 (R94) | P95 (R95) | P96 (G96) | P97 (G97) | P98 (R98) | P99 (R99) |

FIG. 3

| P00 (R00) | P01 (R01) | P02 (G02) | P03 (G03) | P04 (R04) | P05 (R05) | P06 (G06) | P07 (G07) | P08 (R08) | P09 (R09) |
|---|---|---|---|---|---|---|---|---|---|
| P10 (R10) | P11 (R11) | P12 (G12) | P13 (G13) | P14 (R14) | P15 (R15) | P16 (G16) | P17 (G17) | P18 (R18) | P19 (R19) |
| P20 (G20) | P21 (G21) | P22 (B22) | P23 (B23) | P24 (G24) | P25 (G25) | P26 (B26) | P27 (B27) | P28 (G28) | P29 (G29) |
| P30 (G30) | P31 (G31) | P32 (B32) | P33 (B33) | P34 (G34) | P35 (G35) | P36 (B36) | P37 (B37) | P38 (G38) | P39 (G39) |
| P40 (R40) | P41 (R41) | P42 (G42) | P43 (G43) | P44 (R44) | P45 (R45) | P46 (G46) | P47 (G47) | P48 (R48) | P49 (R49) |
| P50 (R50) | P51 (R51) | P52 (G52) | P53 (G53) | P54 (R54) | P55 (R55) | P56 (G56) | P57 (G57) | P58 (R58) | P59 (R59) |
| P60 (G60) | P61 (G61) | P62 (B62) | P63 (B63) | P64 (G64) | P65 (G65) | P66 (B66) | P67 (B67) | P68 (G68) | P69 (G69) |
| P70 (G70) | P71 (G71) | P72 (B72) | P73 (B73) | P74 (G74) | P75 (G75) | P76 (B76) | P77 (B77) | P78 (G78) | P79 (G79) |
| P80 (R80) | P81 (R81) | P82 (G82) | P83 (G83) | P84 (R84) | P85 (R85) | P86 (G86) | P87 (G87) | P88 (R88) | P89 (R89) |
| P90 (R90) | P91 (R91) | P92 (G92) | P93 (G93) | P94 (R94) | P95 (R95) | P96 (G96) | P97 (G97) | P98 (R98) | P99 (R99) |

| P00 (R00) | P01 (R01) | P02 (G02) | P03 (G03) | P04 (R04) | P05 (R05) | P06 (G06) | P07 (G07) | P08 (R08) | P09 (R09) |
|---|---|---|---|---|---|---|---|---|---|
| P10 (R10) | P11 (R11) | P12 (G12) | P13 (G13) | P14 (R14) | P15 (R15) | P16 (G16) | P17 (G17) | P18 (R18) | P19 (R19) |
| P20 (G20) | P21 (G21) | P22 (B22) | P23 (B23) | P24 (G24) | P25 (G25) | P26 (B26) | P27 (B27) | P28 (G28) | P29 (G29) |
| P30 (G30) | P31 (G31) | P32 (B32) | P33 (B33) | P34 (G34) | P35 (G35) | P36 (B36) | P37 (B37) | P38 (G38) | P39 (G39) |
| P40 (R40) | P41 (R41) | P42 (G42) | P43 (G43) | P44 (R44) | P45 (R45) | P46 (G46) | P47 (G47) | P48 (R48) | P49 (R49) |
| P50 (R50) | P51 (R51) | P52 (G52) | P53 (G53) | P54 (R54) | P55 (R55) | P56 (G56) | P57 (G57) | P58 (R58) | P59 (R59) |
| P60 (G60) | P61 (G61) | P62 (B62) | P63 (B63) | P64 (G64) | P65 (G65) | P66 (B66) | P67 (B67) | P68 (G68) | P69 (G69) |
| P70 (G70) | P71 (G71) | P72 (B72) | P73 (B73) | P74 (G74) | P75 (G75) | P76 (B76) | P77 (B77) | P78 (G78) | P79 (G79) |
| P80 (R80) | P81 (R81) | P82 (G82) | P83 (G83) | P84 (R84) | P85 (R85) | P86 (G86) | P87 (G87) | P88 (R88) | P89 (R89) |
| P90 (R90) | P91 (R91) | P92 (G92) | P93 (G93) | P94 (R94) | P95 (R95) | P96 (G96) | P97 (G97) | P98 (R98) | P99 (R99) |

| P00 (R00) | P01 (R01) | P02 (G02) | P03 (G03) | P04 (R04) | P05 (R05) | P06 (G06) | P07 (G07) | P08 (R08) | P09 (R09) |
|---|---|---|---|---|---|---|---|---|---|
| P10 (R10) | P11 (R11) | P12 (G12) | P13 (G13) | P14 (R14) | P15 (R15) | P16 (G16) | P17 (G17) | P18 (R18) | P19 (R19) |
| P20 (G20) | P21 (G21) | P22 (B22) | P23 (B23) | P24 (G24) | P25 (G25) | P26 (B26) | P27 (B27) | P28 (G28) | P29 (G29) |
| P30 (G30) | P31 (G31) | P32 (B32) | P33 (B33) | P34 (G34) | P35 (G35) | P36 (B36) | P37 (B37) | P38 (G38) | P39 (G39) |
| P40 (R40) | P41 (R41) | P42 (G42) | P43 (G43) | P44 (R44) | P45 (R45) | P46 (G46) | P47 (G47) | P48 (R48) | P49 (R49) |
| P50 (R50) | P51 (R51) | P52 (G52) | P53 (G53) | P54 (R54) | P55 (R55) | P56 (G56) | P57 (G57) | P58 (R58) | P59 (R59) |
| P60 (G60) | P61 (G61) | P62 (B62) | P63 (B63) | P64 (G64) | P65 (G65) | P66 (B66) | P67 (B67) | P68 (G68) | P69 (G69) |
| P70 (G70) | P71 (G71) | P72 (B72) | P73 (B73) | P74 (G74) | P75 (G75) | P76 (B76) | P77 (B77) | P78 (G78) | P79 (G79) |
| P80 (R80) | P81 (R81) | P82 (G82) | P83 (G83) | P84 (R84) | P85 (R85) | P86 (G86) | P87 (G87) | P88 (R88) | P89 (R89) |
| P90 (R90) | P91 (R91) | P92 (G92) | P93 (G93) | P94 (R94) | P95 (R95) | P96 (G96) | P97 (G97) | P98 (R98) | P99 (R99) |

| P90 (R90) | P91 (R91) | P92 (G92) | P93 (G93) | P94 (R94) | P95 (R95) | P96 (G96) | P97 (G97) | P98 (R98) |
|---|---|---|---|---|---|---|---|---|
| P80 (R80) | P81 (R81) | P82 (G82) | P83 (G83) | P84 (R84) | P85 (R85) | P86 (G86) | P87 (G87) | P88 (R88) |
| P70 (G70) | P71 (G71) | P72 (B72) | P73 (B73) | P74 (G74) | P75 (G75) | P76 (B76) | P77 (B77) | P78 (G78) |
| P60 (G60) | P61 (G61) | P62 (B62) | P63 (B63) | P64 (G64) | P65 (G65) | P66 (B66) | P67 (B67) | P68 (G68) |
| P50 (R50) | P51 (R51) | P52 (G52) | P53 (G53) | P54 (R54) | P55 (R55) | P56 (G56) | P57 (G57) | P58 (R58) |
| P40 (R40) | P41 (R41) | P42 (G42) | P43 (G43) | P44 (R44) | P45 (R45) | P46 (G46) | P47 (G47) | P48 (R48) |
| P30 (G30) | P31 (G31) | P32 (B32) | P33 (B33) | P34 (G34) | P35 (G35) | P36 (B36) | P37 (B37) | P38 (G38) |
| P20 (G20) | P21 (G21) | P22 (B22) | P23 (B23) | P24 (G24) | P25 (G25) | P26 (B26) | P27 (B27) | P28 (G28) |
| P10 (R10) | P11 (R11) | P12 (G12) | P13 (G13) | P14 (R14) | P15 (R15) | P16 (G16) | P17 (G17) | P18 (R18) |

FIG. 8

| P00 (R00) | P01 (R01) | P02 (G02) | P03 (G03) | P04 (R04) | P05 (R05) | P06 (G06) | P07 (G07) | P08 (R08) | P09 (R09) |
|---|---|---|---|---|---|---|---|---|---|
| P10 (R10) | P11 (R11) | P12 (G12) | P13 (G13) | P14 (R14) | P15 (R15) | P16 (G16) | P17 (G17) | P18 (R18) | P19 (R19) |
| P20 (G20) | P21 (G21) | P22 (B22) | P23 (B23) | P24 (G24) | P25 (G25) | P26 (B26) | P27 (B27) | P28 (G28) | P29 (G29) |
| P30 (G30) | P31 (G31) | P32 (B32) | P33 (B33) | P34 (G34) | P35 (G35) | P36 (B36) | P37 (B37) | P38 (G38) | P39 (G39) |
| P40 (R40) | P41 (R41) | P42 (G42) | P43 (G43) | P44 (R44) | P45 (R45) | P46 (G46) | P47 (G47) | P48 (R48) | P49 (R49) |
| P50 (R50) | P51 (R51) | P52 (G52) | P53 (G53) | P54 (R54) | P55 (R55) | P56 (G56) | P57 (G57) | P58 (R58) | P59 (R59) |
| P60 (G60) | P61 (G61) | P62 (B62) | P63 (B63) | P64 (G64) | P65 (G65) | P66 (B66) | P67 (B67) | P68 (G68) | P69 (G69) |
| P70 (G70) | P71 (G71) | P72 (B72) | P73 (B73) | P74 (G74) | P75 (G75) | P76 (B76) | P77 (B77) | P78 (G78) | P79 (G79) |
| P80 (R80) | P81 (R81) | P82 (G82) | P83 (G83) | P84 (R84) | P85 (R85) | P86 (G86) | P87 (G87) | P88 (R88) | P89 (R89) |
| P90 (R90) | P91 (R91) | P92 (G92) | P93 (G93) | P94 (R94) | P95 (R95) | P96 (G96) | P97 (G97) | P98 (R98) | P99 (R99) |

IMAGE PROCESSING METHOD AND ASSOCIATED IMAGE PROCESSING CIRCUIT

BACKGROUND OF THE INVENTION

1. Field of the Invention

The present invention is related to image processing, and more particularly, to an image processing method applied to a four-cell Bayer sensor.

2. Description of the Prior Art

Figure 1:
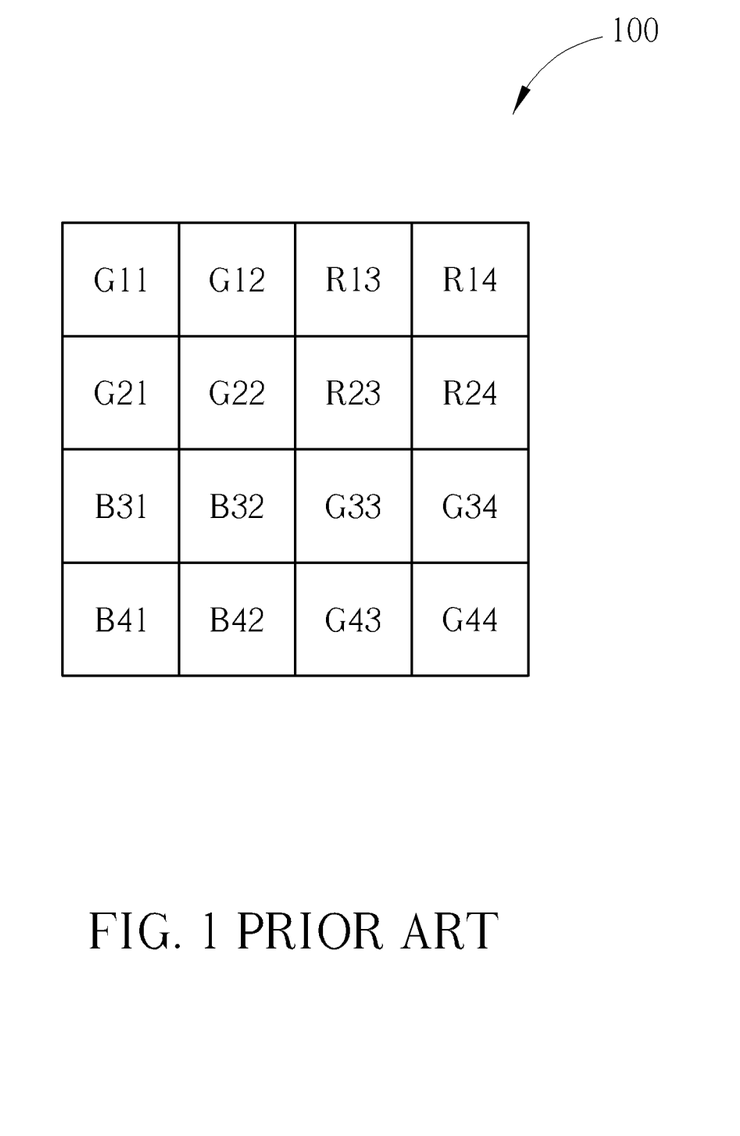
FIG. 1 is a diagram illustrating a color filter array applied to a four-cell Bayer sensor.

FIG. 1 is a diagram illustrating a color filter array 100 applied to a four-cell Bayer sensor. As shown in FIG. 1, the color filter array 100 comprises 16 pixels, where a top left corner illustrates four pixels for generating green information G11, G12, G21 and G22, a top right corner illustrates four pixels for generating red information R13, R14, R23 and R24, a bottom left corner illustrates four pixels for generating blue information B31, B32, B41 and B42, and a bottom right corner illustrates four pixels for generating green information G33, G34, G43 and G44. When the Bayer sensor is in a bright light environment, the color filter array 100 may output color information of the aforementioned 16 pixels; and when the Bayer sensor is in a low light environment, the color filter array 100 may sum up color information of a same color (e.g. sum up the red information R13, R14, R23 and R24) to output a conventional Bayer pattern, in order to sacrifice resolution for the sake of higher light sensitivity.

The color information corresponding to each of the respective 16 pixels outputted by the color filter array 100 comprises a single color. For example, the pixel at the most top left corner only comprises the green information G11. A subsequent image processing circuit may need to use other color information of the surrounding pixels, however, and therefore must undergo interpolation to obtain the lacking color information. For example, the pixel at the most top left corner only comprises the green information G11. The image processing circuit may use blue information within the surrounding pixels to undergo interpolation for obtaining blue information within the pixel at the most top left corner, and use red information within other surrounding pixels to undergo interpolation for obtaining red information within the pixel at the most top left corner. As the color filter array 100 has a particular arrangement, it cannot utilize a single manner of interpolation to process all pixels. For example, relative positions between the four pixels having respective green information G11, G12, G21 and G22 and the surrounding four pixels having respective blue information B31, B32, B41 and B42 are different, meaning the relative positions and weightings for calculating corresponding blue information of the four pixels having the green information G11, G12, G21 and G22 will also be different. Thus, multiple sets of circuits or multiple sets of algorithms are needed for associated interpolation operations, thereby increasing both design and manufacturing costs.

In another related art, the image processing may perform a re-mosaic process on the color information outputted by the color filter array 100 to generate a Bayer pattern, and then adopt de-mosaic technology of the well-known Bayer sensor. This method requires one more interpolation operation, however. Image details may be lost which impact image quality.

SUMMARY OF THE INVENTION

This in mind, an objective of the present invention is to provide an image processing method, which can process raw image data outputted by a four-cell Bayer sensor by using a single manner of interpolation without performing a de-mosaic process on the raw image data, to solve the problems of the related art.

In an embodiment of the present invention, an image processing method is disclosed. The image processing method comprises the steps of: receiving raw image data from an image sensor, wherein the image sensor is a four-cell Bayer sensor, the raw image data comprises color information of each pixel, and the color information of each pixel only corresponds to a single color; for a specific pixel to be processed, selecting a region comprising the specific pixel; referring to a position of the specific pixel to determine whether to flip color information within the region to generate a flipped region; and using color information of at least one portion of pixels within the region or the flipped region to perform an interpolation operation, to generate color information that the specific pixel lacks.

In another embodiment of the present invention, an image processing circuit is disclosed. The image processing circuit comprises a receiving circuit, a pre-processing circuit coupled to the receiving circuit, and an interpolation circuit coupled to the pre-processing circuit. In operations of the image processing circuit, the receiving circuit is configured to receive raw image data from an image sensor, wherein the image sensor is a four-cell Bayer sensor, the raw image data comprises color information of each pixel, and the color information of each pixel only corresponds to a single color; for a specific pixel to be processed, the pre-processing circuit is configured to select a region comprising the specific pixel, and a position of the specific pixel is referred to in order to determine whether to flip color information within the region to generate a flipped region; and an interpolation circuit is configured to use color information of at least one portion of pixels within the region or the flipped region to perform an interpolation operation, for generating color information that the specific pixel lacks.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
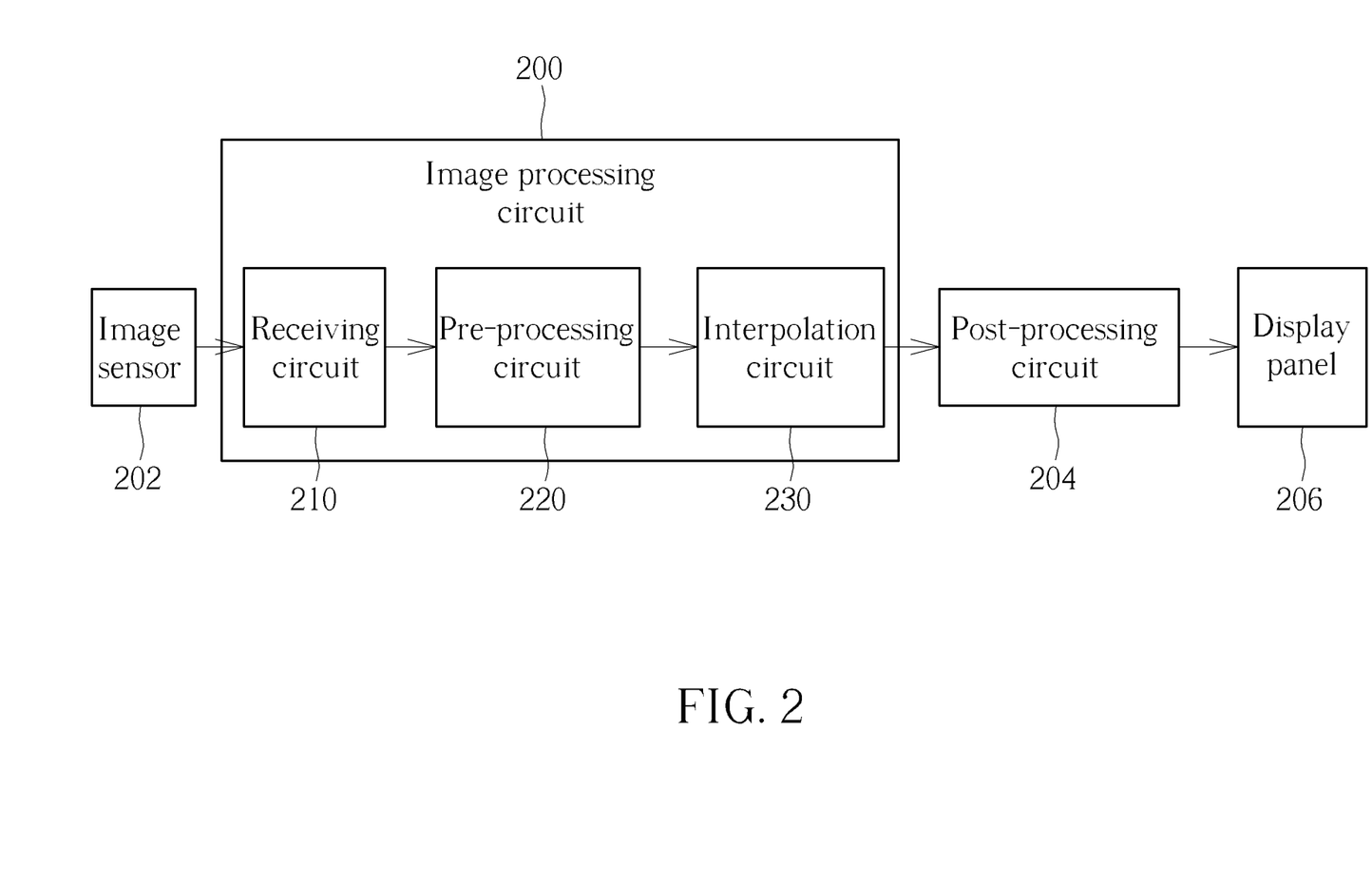
FIG. 2 is a diagram illustrating an image processing circuit according to an embodiment of the present invention.

FIG. 2 is a diagram illustrating an image processing circuit 200 according to an embodiment of the present invention. As shown in FIG. 2, the image processing circuit 200 is configured to receive raw image data from an image sensor 202, and perform an interpolation operation on the raw image data to fill in color information that each pixel lacks and then generate processed image data. After being processed by a post-processing circuit 204, the processed image data is transmitted to a display panel 206 for being displayed thereon. In this embodiment, the image sensor 202 is a four-cell Bayer sensor, e.g. the image sensor 202 comprising the color filter array 100 shown in FIG. 1. In addition, the image processing circuit 200 comprises a receiving circuit 210, a pre-processing circuit 220 coupled to the receiving circuit 210, and an interpolation circuit 230 coupled to the pre-processing circuit 220. It should be noted that the color filter array 100 is for illustrative purposes only, and in practice the image sensor 202 may have multiple color filter arrays 100 sequentially arranged.

Figure 3:
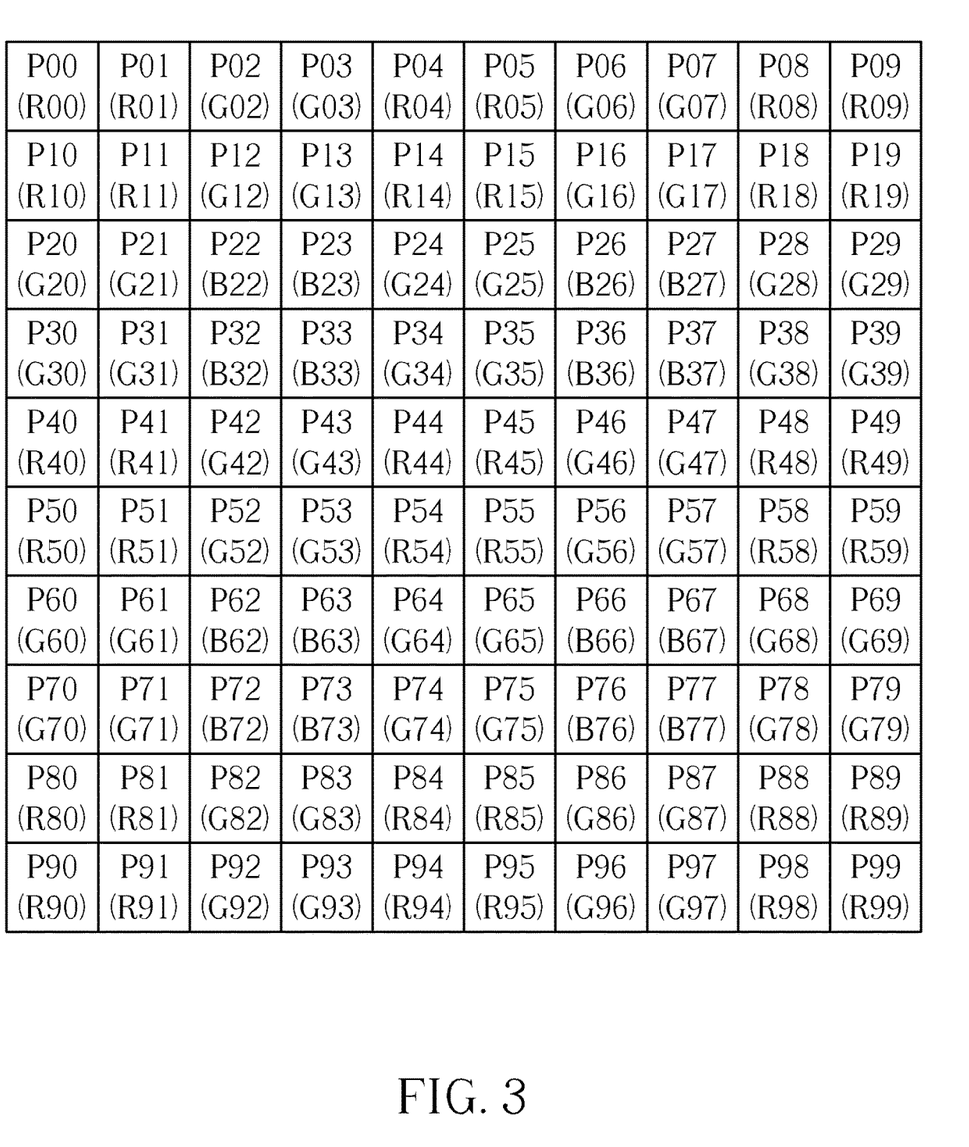
FIG. 3 is a diagram illustrating raw image data generated by an image sensor.

In operations of the image processing circuit 200, the receiving circuit 210 is configured to receive the raw image data from the image sensor 202, where the raw image data comprises color information of each pixel, and the color information of each pixel only corresponds to a single color. For better comprehension, an example of the raw image data is illustrated by FIG. 3. The raw image data comprises a 10*10 pixel array, which comprises pixels P00-P99 and corresponding color information, where Rxx in figures represent red information (e.g. R00, R01, . . . ), Gxx in figures represent green information (e.g. G02, G03, . . . ), Bxx in figures represent blue information (e.g. B22, B33, . . . ), and each of the pixels P00-P99 only has a single color (e.g. color information). For a specific pixel to be processed, the pre-processing circuit 220 selects a region comprising the specific pixel, and refers to a position of the specific pixel to determine whether to flip color information within the region to generate a flipped region. More particularly, for four pixels within the raw image data that are adjacent with one another and have a same single color, if the position of the specific pixel corresponds to a first pixel within the four pixels, the pre-processing circuit 220 prevents flipping the color information within the region; if the position of the specific pixel corresponds to a second pixel within the four pixel, the pre-processing circuit 220 horizontally flips the color information within the region to generate the flipped region; if the position of the specific pixel corresponds to a third pixel within the four pixel, the pre-processing circuit 220 vertically flips the color information within the region to generate the flipped region; and if the position of the specific pixel corresponds to a fourth pixel within the four pixel, the pre-processing circuit 220 horizontally and vertically flips the color information within the region to generate the flipped region.

Figure 4:
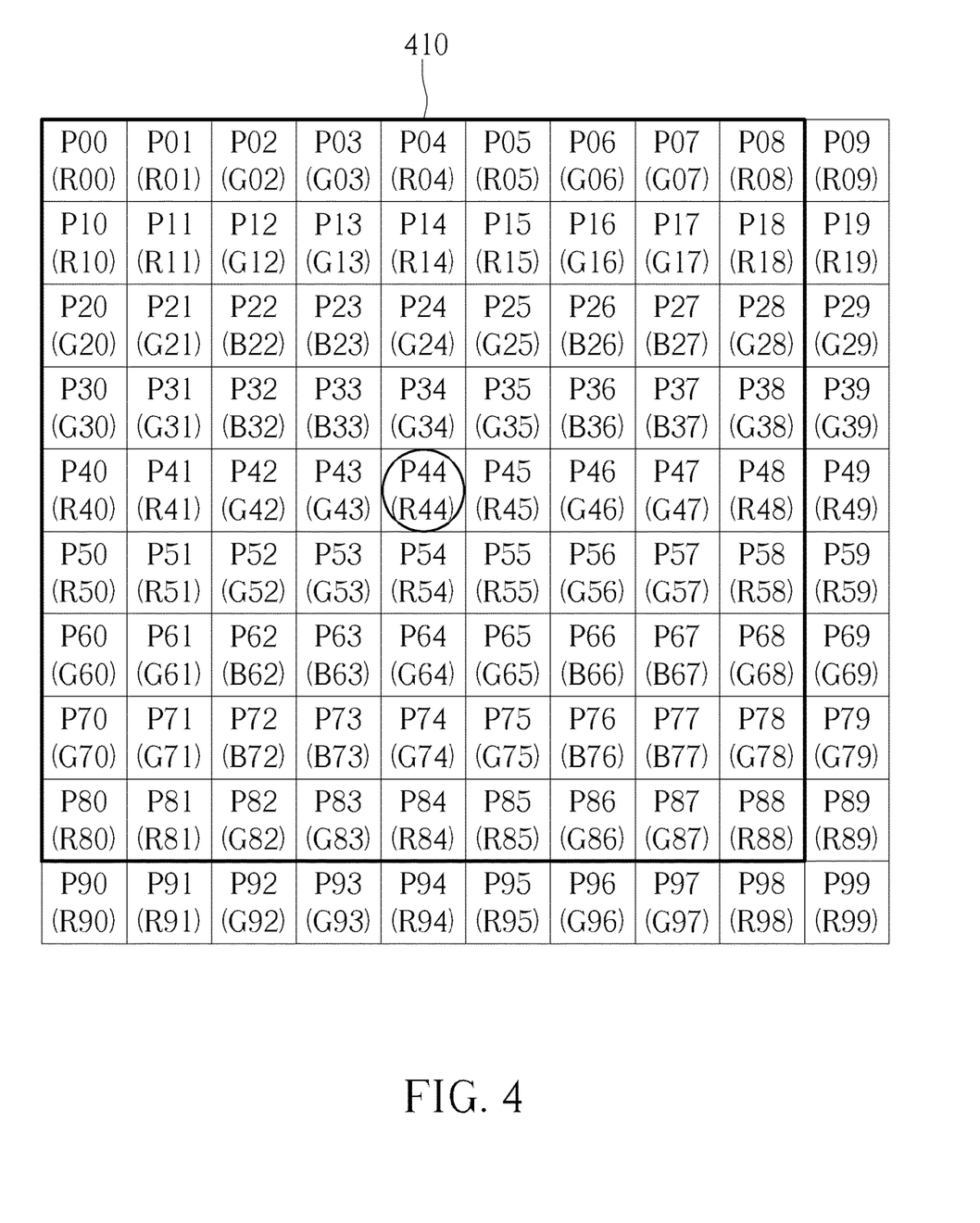
FIG. 4 is a diagram illustrating a region selected for a specific pixel P44.

In detail, assume that pixels P44, P45, P54 and P55 are respectively taken as specific pixels to be processed. Referring to FIG. 4, assume that the image processing circuit 100 currently need to process the specific pixel P44 having red information R44 (e.g. the processing circuit 100 need to process the specific pixel P44 to obtain the lacking green information and blue information), the pre-processing circuit 220 may select a 9*9 region 410 (e.g. pixels P00-P88) centered on the specific pixel P44. In this embodiment, when the specific pixel P44 is the pixel being processed, the region 410 does not undergo any flip.

Figure 5:
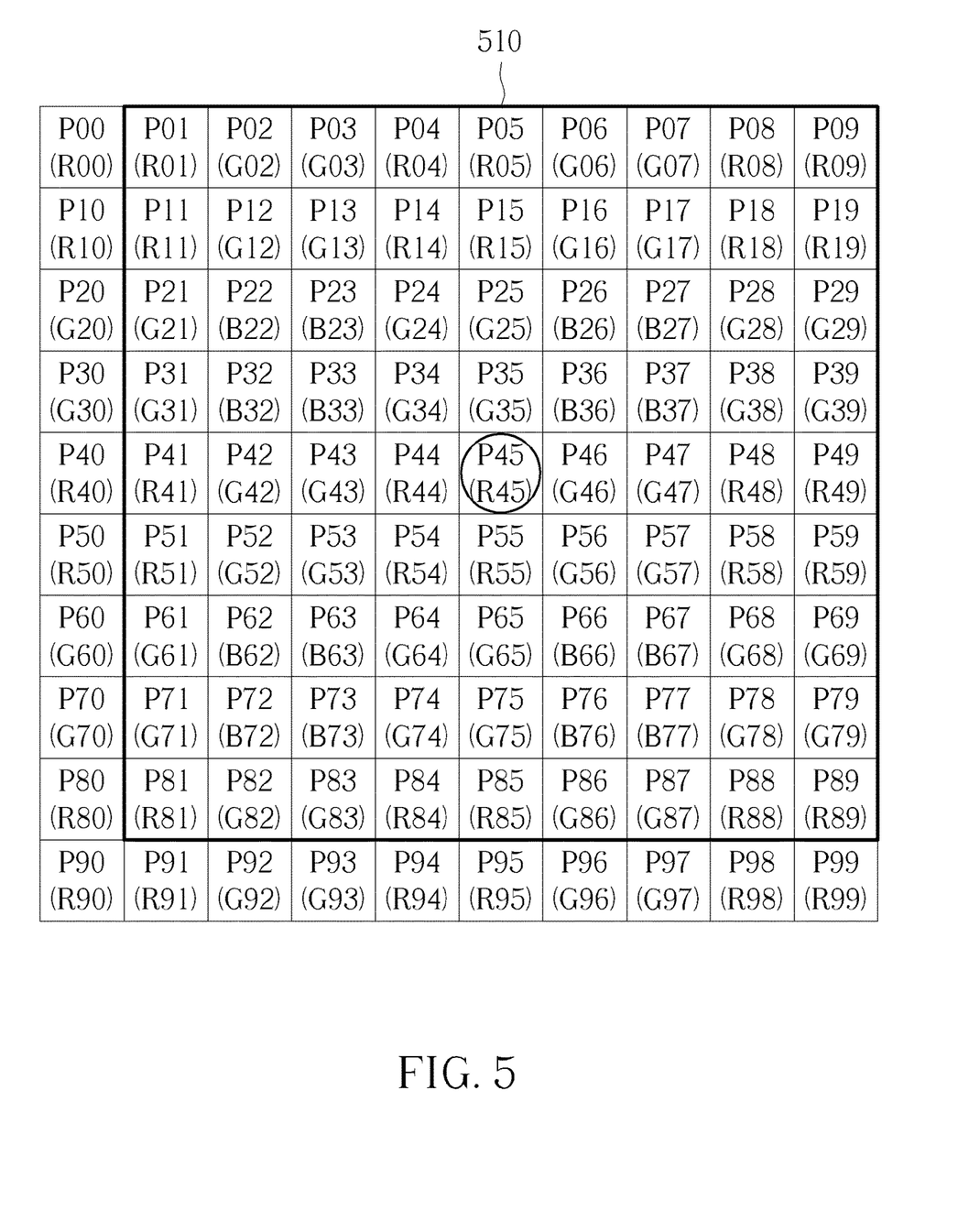
FIG. 5 is a diagram illustrating a region selected for a specific pixel P45.
Figure 6:
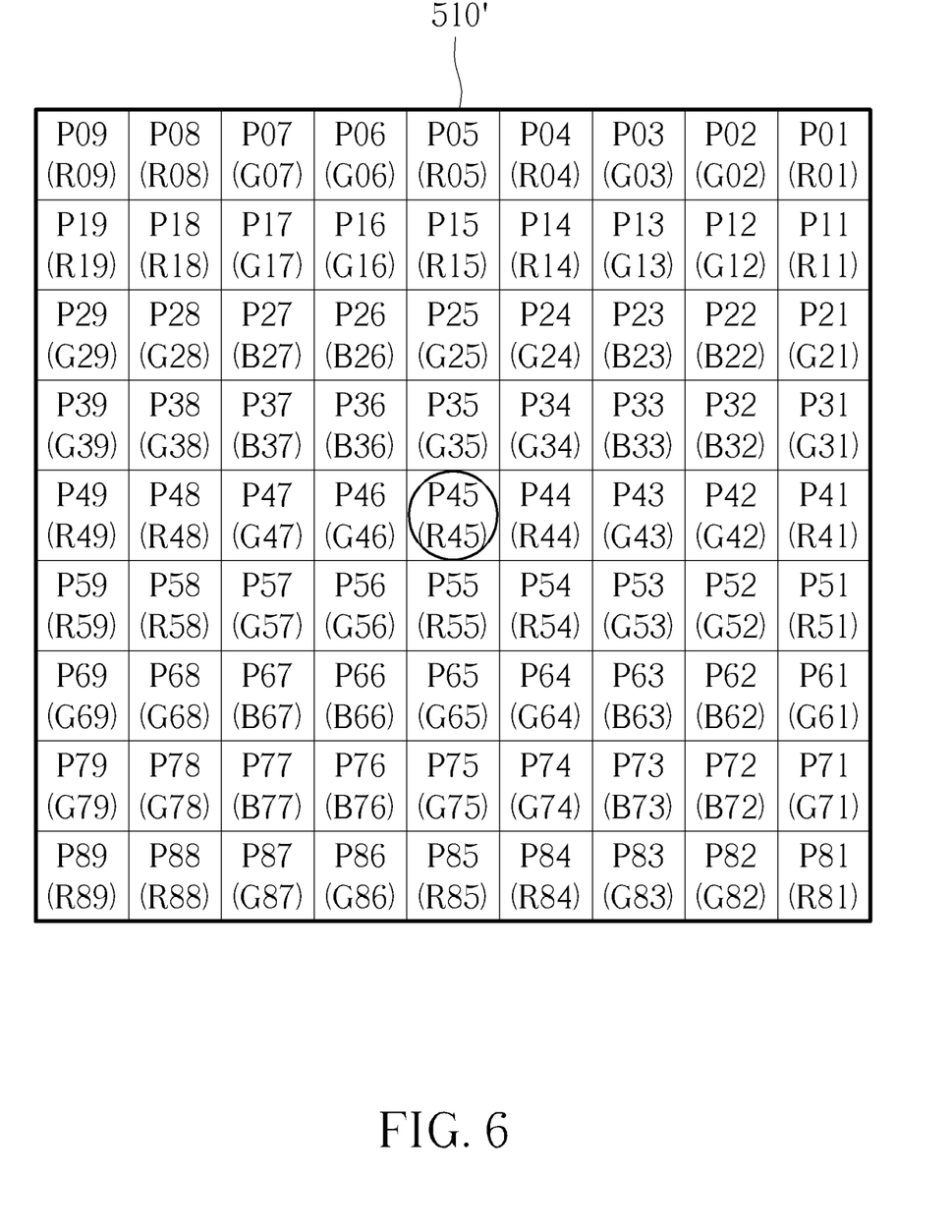
FIG. 6 is a diagram illustrating a flipped region generated by horizontally flipping a region selected for a specific pixel P45.

Referring to FIG. 5, assume that the image processing circuit 100 needs to process the specific pixel P45 having red information R45 (e.g. the image processing circuit 100 needs to process the specific pixel P45 to obtain the lacking green information and blue information), the pre-processing circuit 220 may select a 9*9 region 510 (e.g. pixels P01-P89) centered on the specific pixel P45, and horizontally flip the region 510 to obtain a flipped region 510' shown in FIG. 6. In detail, in the process of horizontally flipping, pixels P05, P15, P25, P35, P45, P55, P64, P75 and P85 are configured to be an axis for flipping color information of the left side and the right side, e.g. the first column of the flipped region 510' is the last column of the region 510, the second column of the flipped region 510' is the second last column of the region 510, . . . , and the rest may be deduced by analogy. In practical circuit operations, the flipped region 510' may be obtained by reading each row of the region 510 in the opposite direction.

Figure 7:
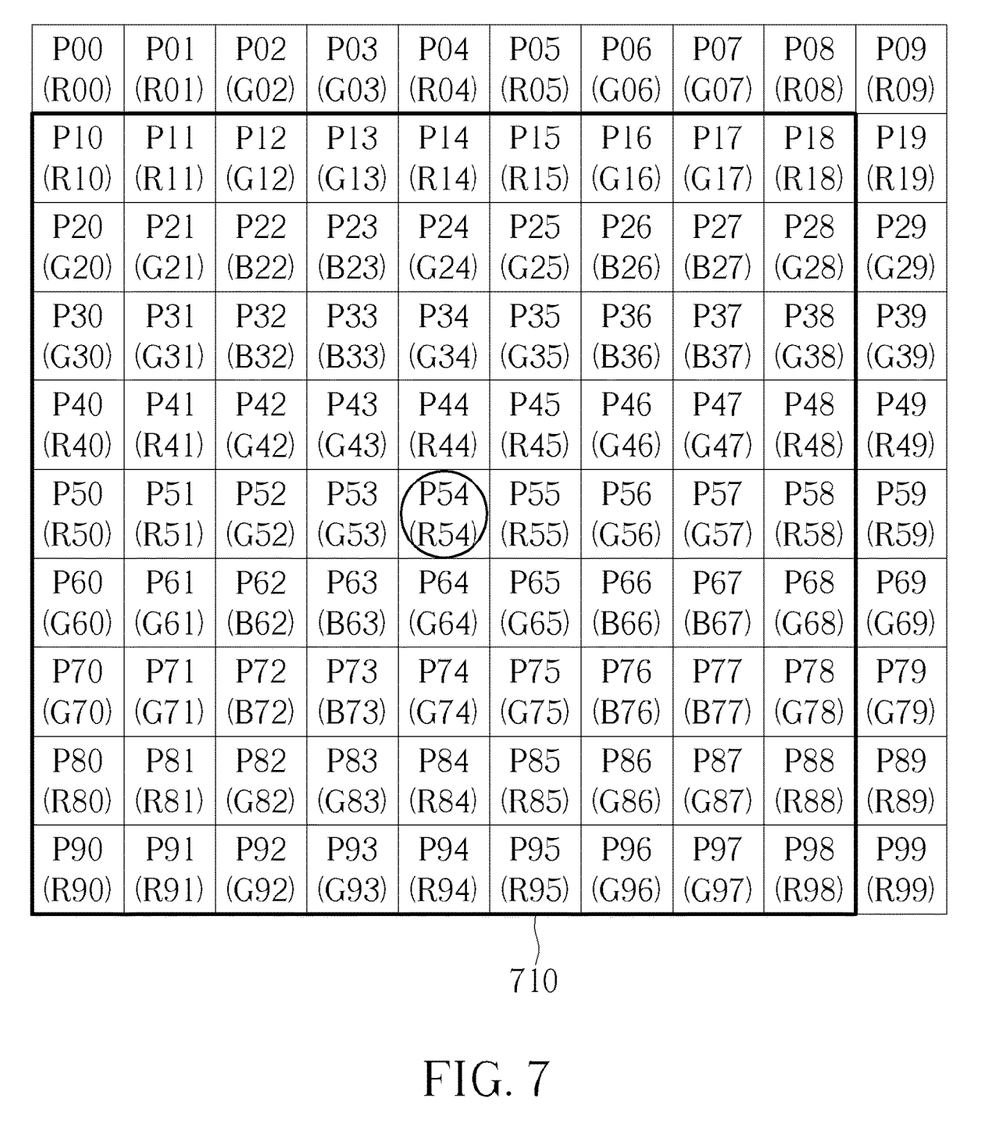
FIG. 7 is a diagram illustrating a region selected for a specific pixel P54.
Figure 8:
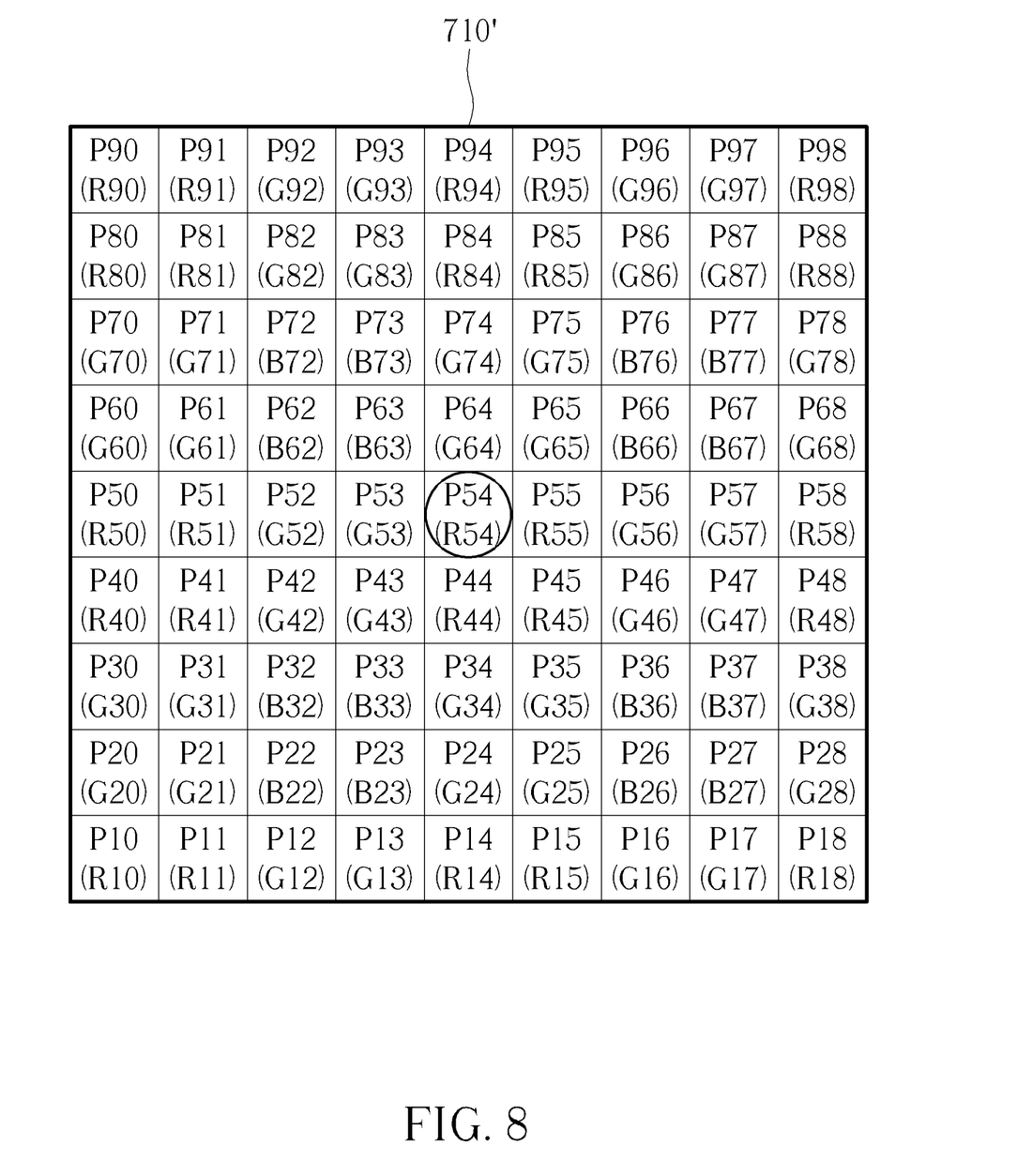
FIG. 8 is a diagram illustrating a flipped region generated by vertically flipping a region selected for a specific pixel P54.

Referring to FIG. 7, assume that the image processing circuit 100 needs to process the specific pixel P54 having red information R54 (e.g. the image processing circuit 100 needs to process the specific pixel P54 to obtain the lacking green information and blue information), the pre-processing circuit 220 may select a 9*9 region 710 (e.g. pixels P10-P98) centered on the specific pixel P54, and vertically flip the region 710 to obtain a flipped region 710' shown in FIG. 8. In detail, in the process of vertically flipping, pixels P50, P51, P52, P53, P54, P55, P56, P57 and P58 are configured to be an axis for flipping color information of the upper side and the lower side, e.g. the first row of the flipped region 710' is the last row of the region 710, the second row of the flipped region 710' is the second last row of the region 710, . . . , and the rest may be deduced by analogy. In practical circuit operations, the flipped region 710' may be obtained by reading each column of the region 710 in the opposite direction.

Figure 9:
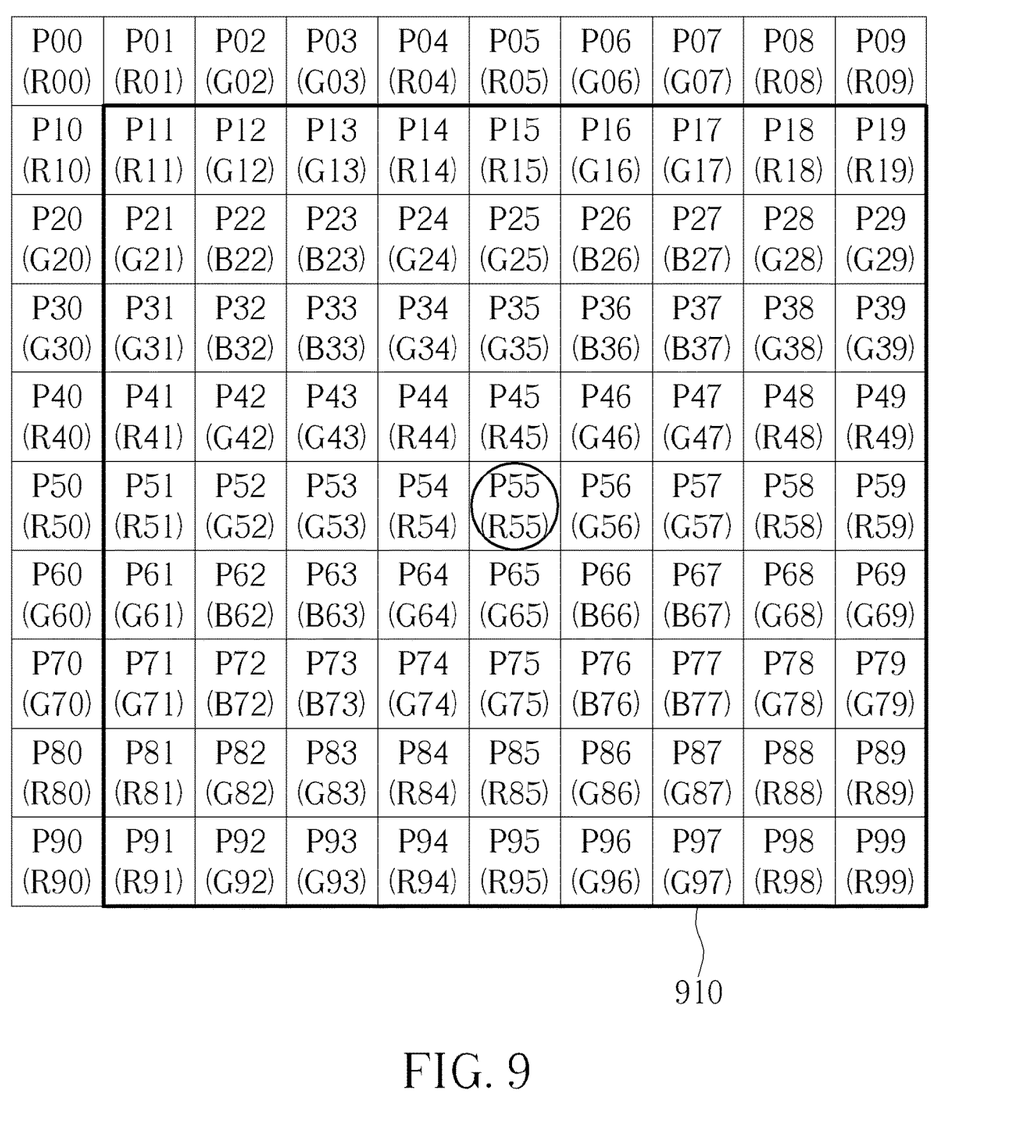
FIG. 9 is a diagram illustrating a region selected for a specific pixel P55.
Figure 10:
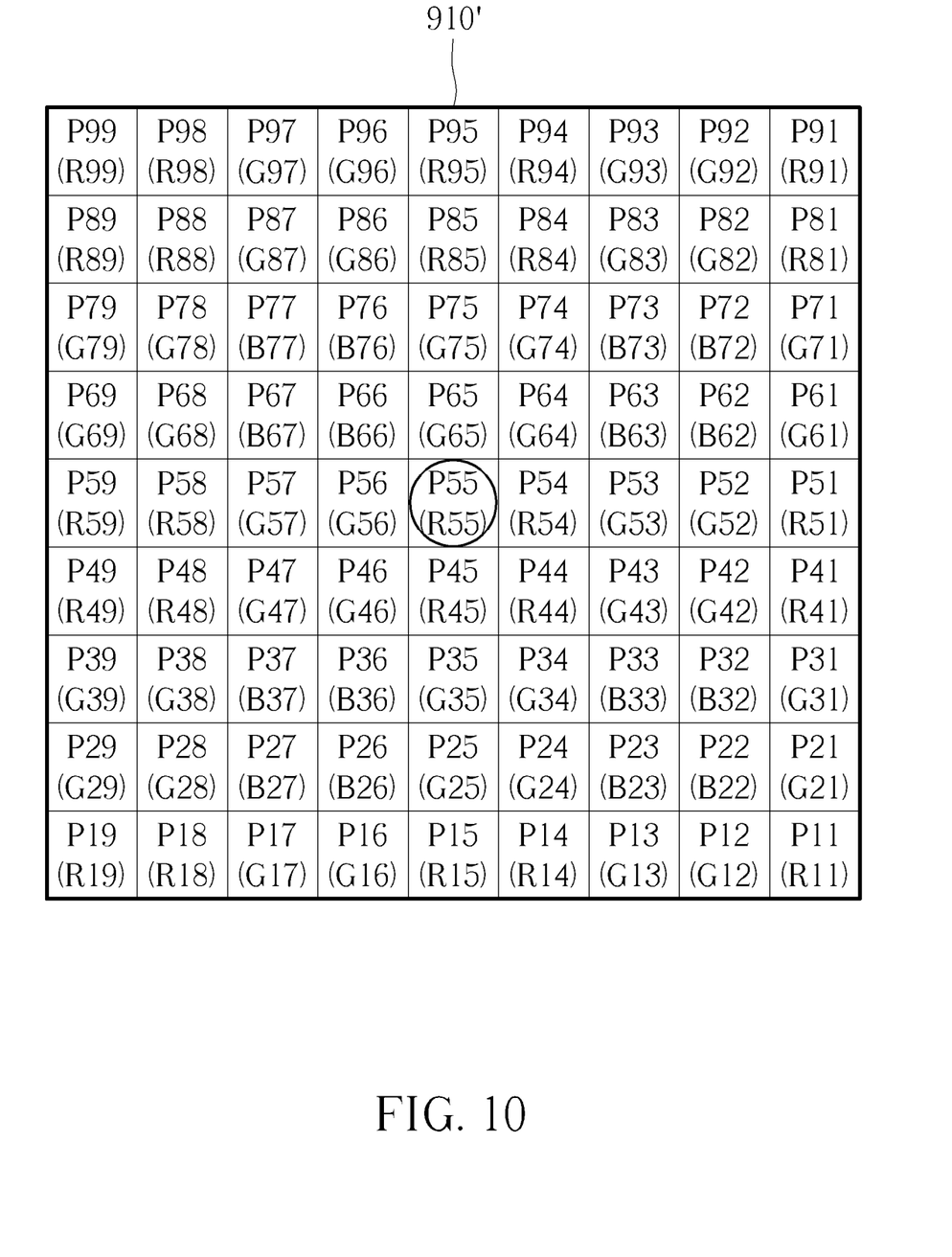
FIG. 10 is a diagram illustrating a flipped region generated by horizontally and vertically flipping a region selected for a specific pixel P55.

Referring to FIG. 9, assume that the image processing circuit 100 needs to process the specific pixel P55 having red information R55 (e.g. the image processing circuit 100 needs to process the specific pixel P55 to obtain the lacking green information and blue information), the pre-processing circuit 220 may select a 9*9 region 910 (e.g. pixels P11-P99) centered on the specific pixel P55, and vertically and horizontally flip the region 910 to obtain a flipped region 910' shown in FIG. 10. In practical circuit operations, a temporary region may be obtained by reading each column of the region 910 in the opposite direction, and the flipped region 910' may be obtained by reading each row of the temporary region in the opposite direction.

As mentioned above, as the region 410, the flipped region 510', the flipped region 710' and the flipped region 910' have a same distribution of color information (e.g. pixels having a same coordinate within region 410, the flipped region 510', the flipped region 710' and the flipped region 910' have same color information), no matter which one of the specific pixels P44, P45, P54 and P55 is currently processed, the interpolation circuit 120 may use a same manner of interpolation to perform the interpolation operation on color information of at least one portion of pixels within the region 410 or the flipped region 510', 710' or 910', to generate color information that the specific pixels P44, P45, P54 or P55 lack. In this embodiment, the same manner of interpolation means the at least one portion of pixels and the specific pixel have fixed relative positions and/or fixed weightings. For example, assuming that the interpolation circuit 230 is going to process the specific pixel P44 to obtain the blue information thereof, the interpolation circuit 230 may select blue information of pixels P22, P23, P26, P32, P33, P36, P62, P63 and P66 within the region 410 to undergo the interpolation operation (e.g. weighted addition or weighted average) to generate the blue information that the pixel P44 lacks; assuming that the interpolation circuit 230 is going to process the specific pixel P45 to obtain the blue information thereof, the interpolation circuit 230 may select blue information of pixels P27, P26, P23, P37, P36, P33, P67, P66 and P63 within the flipped region 510' to undergo the interpolation operation to generate the blue information that the pixel P45 lacks; assuming that the interpolation circuit 230 is going to process the specific pixel P54 to obtain the blue information thereof, the interpolation circuit 230 may select blue information of pixels P72, P73, P76, P62, P63, P66, P32, P33 and P36 within the flipped region 710' to undergo the interpolation operation to generate the blue information that the pixel P54 lacks; and assuming that the interpolation circuit 230 is going to process the specific pixel P55 to obtain the blue information thereof, the interpolation circuit 230 may select blue information of pixels P77, P76, P73, P67, P66, P63, P37, P36 and P33 within the flipped region 710' to undergo the interpolation operation to generate the blue information that the pixel P54 lacks. As mentioned above, as the pixels having blue information that are selected to undergo the interpolation operation and the specific pixel have the same relative positions, the interpolation circuit 230 may utilize a same circuit or adopt a same algorithm to process different specific pixels. In this way, manufacturing and design costs may be effectively reduced.

Figure 11:
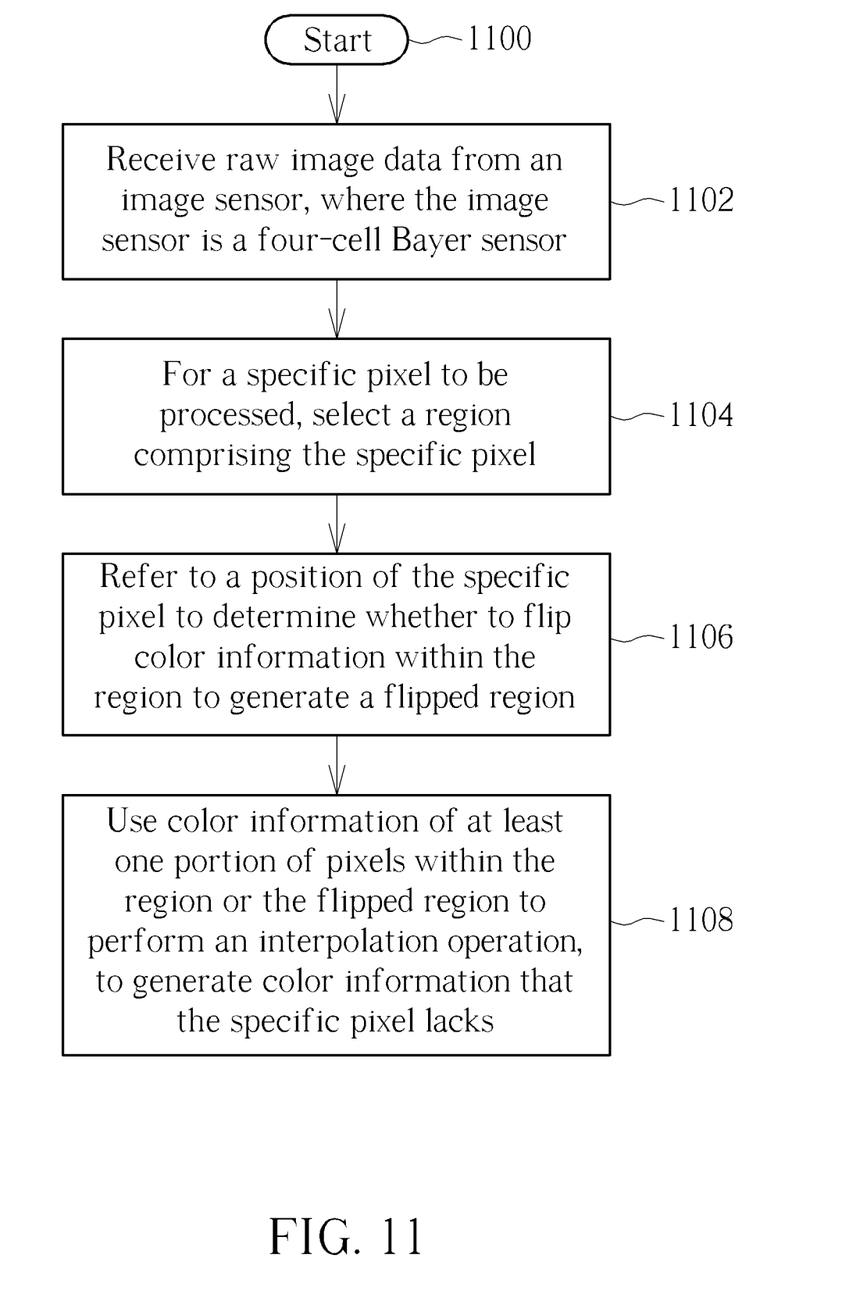
FIG. 11 is a flowchart of an image processing method according to an embodiment of the present invention.

FIG. 11 is a flowchart illustrating an image processing method according to an embodiment of the present invention. Referring to descriptions mentioned in the above embodiments, a flow of the image processing method is as follows.

Step 1100: the flow starts.

Step 1102: receive raw image data from an image sensor, where the image sensor is a four-cell Bayer sensor.

Step 1104: fora specific pixel to be processed, select a region comprising the specific pixel.

Step 1106: refer to a position of the specific pixel to determine whether to flip color information within the region to generate a flipped region.

Step 1108: use color information of at least one portion of pixels within the region or the flipped region to perform an interpolation operation, to generate color information that the specific pixel lacks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
receiving raw image data from an image sensor, wherein the image sensor is a four-cell Bayer sensor, the raw image data comprises color information of each pixel, and the color information of each pixel only corresponds to a single color;
for a specific pixel to be processed, selecting a region comprising the specific pixel;
referring to a position of the specific pixel to determine whether to flip color information within the region to generate a flipped region; and
using color information of at least one portion of pixels within the region or the flipped region to perform an interpolation operation, to generate color information that the specific pixel lacks
wherein the step of referring to the position of the specific pixel to determine whether to flip color information within the region to generate the flipped region comprises:
referring to the position of the specific pixel to determine whether to horizontally flip, vertically flip, or horizontally and vertically flip the color information within the region to generate the flipped region.

2. The image processing method of claim 1, wherein the step of referring to the position of the specific pixel to determine whether to horizontally flip, vertically flip, or horizontally and vertically flip the color information within the region to generate the flipped region comprises:
for four pixels within the raw image data that are adjacent with one another and have a same single color, if the position of the specific pixel corresponds to a first pixel within the four pixels, preventing flipping the color information within the region; if the position of the specific pixel corresponds to a second pixel within the four pixels, horizontally flipping the color information within the region to generate the flipped region; if the position of the specific pixel corresponds to a third pixel within the four pixels, vertically flipping the color information within the region to generate the flipped region; and if the position of the specific pixel corresponds to a fourth pixel within the four pixels, horizontally and vertically flipping the color information within the region to generate the flipped region.

3. The image processing method of claim 2, wherein no matter which pixel within the four pixels corresponds to the specific pixel, the region or the flipped region for undergoing the interpolation operation has a same distribution of color information.

4. The image processing method of claim 3, wherein the step of using the color information of the at least one portion of pixels within the region or the flipped region to perform the interpolation operation to generate the color information that the specific pixel lacks comprises:
whether for the region or the flipped region, using a same manner of interpolation to perform the interpolation operation on the color information of the at least one portion of pixels within the region or the flipped region, to generate the color information that the specific pixel lacks.

5. The image processing method of claim 2, wherein the step of using the color information of the at least one portion of pixels within the region or the flipped region to perform the interpolation operation to generate the color information that the specific pixel lacks comprises:
whether for the region or the flipped region, using a same manner of interpolation to perform the interpolation operation on the color information of the at least one portion of pixels within the region or the flipped region, to generate the color information that the specific pixel lacks.

6. The image processing method of claim 1, wherein the step of using the color information of the at least one portion of pixels within the region or the flipped region to perform the interpolation operation to generate the color information that the specific pixel lacks comprises:

whether for the region or the flipped region, using a same manner of interpolation to perform the interpolation operation on the color information of the at least one portion of pixels within the region or the flipped region, to generate the color information that the specific pixel lacks.

7. The image processing method of claim 6, wherein the same manner of interpolation means the at least one portion of pixels and the specific pixel have fixed relative positions.

8. The image processing method of claim 1, wherein the step of using the color information of the at least one portion of pixels within the region or the flipped region to perform the interpolation operation to generate the color information that the specific pixel lacks comprises:

whether for the region or the flipped region, using a same manner of interpolation to perform the interpolation operation on the color information of the at least one portion of pixels within the region or the flipped region, to generate the color information that the specific pixel lacks.

9. The image processing method of claim 8, wherein the same manner of interpolation means the at least one portion of pixels and the specific pixel have fixed relative positions and fixed weightings.

10. An image processing circuit, comprising:
a receiving circuit, configured to receive raw image data from an image sensor, wherein the image sensor is a four-cell Bayer sensor, the raw image data comprises color information of each pixel, and the color information of each pixel only corresponds to a single color;
a pre-processing circuit, coupled to the receiving circuit, wherein for a specific pixel to be processed, the pre-processing circuit is configured to select a region comprising the specific pixel, and a position of the specific pixel is referred to in order to determine whether to flip color information within the region to generate a flipped region; and
an interpolation circuit, coupled to the pre-processing circuit, configured to use color information of at least one portion of pixels within the region or the flipped region to perform an interpolation operation, to generate color information that the specific pixel lacks;
wherein the pre-processing circuit refers to the position of the specific pixel to determine whether to horizontally flip, vertically flip, or horizontally and vertically flip the color information within the region to generate the flipped region.

11. The image processing circuit of claim 10, wherein for four pixels within the raw image data that are adjacent with one another and have a same single color, if the position of the specific pixel corresponds to a first pixel within the four pixels, the pre-processing circuit prevents flipping the color information within the region; if the position of the specific pixel corresponds to a second pixel within the four pixels, the pre-processing circuit horizontally flips the color information within the region to generate the flipped region; if the position of the specific pixel corresponds to a third pixel within the four pixels, the pre-processing circuit vertically flips the color information within the region to generate the flipped region; and if the position of the specific pixel corresponds to a fourth pixel within the four pixels, the pre-processing circuit horizontally and vertically flips the color information within the region to generate the flipped region.

12. The image processing circuit of claim 11, wherein no matter which pixel within the four pixels corresponds to the specific pixel, the region or the flipped region for undergoing the interpolation operation has a same distribution of color information.

13. The image processing circuit of claim 12, wherein whether for the region or the flipped region, the interpolation circuit uses a same manner of interpolation to perform the interpolation operation on the color information of the at least one portion of pixels within the region or the flipped region, to generate the color information that the specific pixel lacks.

14. The image processing circuit of claim 11, wherein whether for the region or the flipped region, the interpolation circuit uses a same manner of interpolation to perform the interpolation operation on the color information of the at least one portion of pixels within the region or the flipped region, to generate the color information that the specific pixel lacks.

15. The image processing circuit of claim 10, wherein whether for the region or the flipped region, the interpolation circuit uses a same manner of interpolation to perform the interpolation operation on the color information of the at least one portion of pixels within the region or the flipped region, to generate the color information that the specific pixel lacks.

16. The image processing circuit of claim 15, wherein the same manner of interpolation means the at least one portion of pixels and the specific pixel have fixed relative positions.

17. The image processing circuit of claim 10, wherein whether for the region or the flipped region, the interpolation circuit uses a same manner of interpolation to perform the interpolation operation on the color information of the at least one portion of pixels within the region or the flipped region, to generate the color information that the specific pixel lacks.

18. The image processing method of claim 17, wherein the same manner of interpolation means the at least one portion of pixels and the specific pixel have fixed relative positions and fixed weightings.

* * * * *